United States Patent
Van Der Burgt et al.

(10) Patent No.: US 11,919,211 B2
(45) Date of Patent: Mar. 5, 2024

(54) PROCESS FOR PLASTIC OVERMOLDING ON A METAL SURFACE AND PLASTIC-METAL HYBRIDE PART

(71) Applicant: DSM IP Assets B.V., Heerlen (NL)

(72) Inventors: Frank Peter Theodorus Johannes Van Der Burgt, Echt (NL); Ruogu Liao, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 575 days.

(21) Appl. No.: 16/621,086

(22) PCT Filed: Jun. 11, 2018

(86) PCT No.: PCT/EP2018/065368
§ 371 (c)(1),
(2) Date: Dec. 10, 2019

(87) PCT Pub. No.: WO2018/228999
PCT Pub. Date: Dec. 20, 2018

(65) Prior Publication Data
US 2021/0138704 A1    May 13, 2021

(30) Foreign Application Priority Data

Jun. 14, 2017 (EP) .................................. 17176096
Jun. 16, 2017 (WO) ............... PCT/CN2017/088639

(51) Int. Cl.
*B29C 45/14* (2006.01)
*B29C 45/00* (2006.01)
(Continued)

(52) U.S. Cl.
CPC .... *B29C 45/14311* (2013.01); *B29C 45/0005* (2013.01); *B32B 15/088* (2013.01);
(Continued)

(58) Field of Classification Search
None
See application file for complete search history.

(56) References Cited

U.S. PATENT DOCUMENTS 8,858,854 B2   10/2014  Oin
9,166,212 B2   10/2015  Naritomi et al.
(Continued)

FOREIGN PATENT DOCUMENTS

CN    103119092    5/2013
CN    103228418    7/2013
(Continued)

OTHER PUBLICATIONS

Li—CN 106009544 A—ISR D1—MT—polyester molding w—nano molding—2016 (Year: 2016).*
(Continued)

*Primary Examiner* — John Vincent Lawler
(74) *Attorney, Agent, or Firm* — NIXON & VANDERHYE P.C.

(57) ABSTRACT

The invention relates to a process for manufacturing a plastic-metal hybrid part by plastic overmolding on a metal surface via nano-molding technology (NMT), wherein the moldable plastic material is a polymer composition comprising thermoplastic polyamide, or a thermoplastic polyester, or a blend thereof, and boron silicon glass fibers. The invention also relates to a plastic-metal hybrid part, obtainable by said process, wherein a metal part is overmolded by a polymer composition comprising thermoplastic polyamide, or a thermoplastic polyester, or a blend thereof, and boron silicon glass fibers.

11 Claims, 1 Drawing Sheet

(51) Int. Cl.
  *B29K 67/00* (2006.01)
  *B29K 77/00* (2006.01)
  *B29K 81/00* (2006.01)
  *B29K 309/08* (2006.01)
  *B29L 31/34* (2006.01)
  *B32B 15/088* (2006.01)
  *B32B 15/09* (2006.01)
  *C08L 67/02* (2006.01)
  *C08L 77/06* (2006.01)

(52) U.S. Cl.
  CPC .............. *B32B 15/09* (2013.01); *C08L 67/02* (2013.01); *C08L 77/06* (2013.01); *B29C 2045/14803* (2013.01); *B29C 2045/14868* (2013.01); *B29K 2067/00* (2013.01); *B29K 2077/00* (2013.01); *B29K 2081/04* (2013.01); *B29K 2309/08* (2013.01); *B29L 2031/3493* (2013.01); *C08L 2205/025* (2013.01); *C08L 2205/03* (2013.01)

(56) References Cited

U.S. PATENT DOCUMENTS

| | | | | |
|---|---|---|---|---|
| 9,724,898 | B2 | 8/2017 | Naritomi et al. | |
| 2004/0102559 | A1* | 5/2004 | Oyamada | C08K 3/04 524/495 |
| 2009/0274889 | A1* | 11/2009 | Iwahashi | B29C 45/14778 428/312.8 |
| 2010/0279120 | A1* | 11/2010 | Naritomi | B29C 66/1122 29/527.1 |
| 2011/0250377 | A1* | 10/2011 | Qin | B32B 27/286 428/458 |
| 2013/0022786 | A1* | 1/2013 | Topoulos | C08K 7/14 428/141 |
| 2014/0329944 | A1* | 11/2014 | Harder | C08G 69/265 524/133 |
| 2014/0363660 | A1* | 12/2014 | Gong | B29C 45/14311 428/312.8 |
| 2015/0224742 | A1 | 8/2015 | Inoue et al. | |
| 2016/0355679 | A1* | 12/2016 | Aepli | C08L 77/06 |
| 2017/0029615 | A1* | 2/2017 | He | C08K 3/013 |
| 2017/0058099 | A1* | 3/2017 | Endtner | B29C 45/0055 |

FOREIGN PATENT DOCUMENTS

| | | | |
|---|---|---|---|
| CN | 104583458 | | 4/2015 |
| CN | 104629273 | | 5/2015 |
| CN | 104583458 | | 10/2015 |
| CN | 104985750 | A | 10/2015 |
| CN | 105694447 | * | 6/2016 .............. C08K 13/06 |
| CN | 106009544 | * | 10/2016 .............. C08K 13/04 |
| CN | 106009544 | A * | 10/2016 .............. C08L 67/02 |
| CN | 106519594 | | 3/2017 |
| EP | 2 572 876 | A1 | 3/2013 |
| EP | 1958763 | | 11/2013 |
| JP | 2007-182071 | | 7/2007 |
| JP | 2009-298144 | | 12/2009 |
| JP | 2010-64397 | | 3/2010 |
| JP | 2016-33209 | | 3/2016 |
| JP | 2016033209 | * | 3/2016 .............. C98G 69/26 |
| JP | 2016-60051 | | 4/2016 |
| JP | 2007182071 | | 7/2019 |
| WO | 2007/040245 | | 4/2007 |
| WO | WO2012/044903 | | 5/2012 |
| WO | WO 2012/070654 | | 5/2012 |
| WO | WO-2016194361 | A1 * | 12/2016 ........... B23K 26/364 |
| WO | WO 2018/053907 | | 3/2018 |

OTHER PUBLICATIONS

Ezaki—WO 2016-194361 A1—MT—metal-resin molding—metal w—fine recesses—2016 (Year: 2016).*
Cao—CN 105694447 A—ISR D3—MT—NMT w—LDS additive—2016 (Year: 2016).*
Takano—JP 2016-033209 A—MT—polyamide w—D-glass + preference—2016 (Year: 2016).*
International Search Report for PCT/EP2018/065368, dated Aug. 8, 2018, 3 pages.
Written Opinion of the ISA for PCT/EP2018/065368, dated Aug. 8, 2018, 6 pages.
Kovács, J. G., Shrinkage Alteration Induced by Segregation of Glass Beads in Injection Molded PA6: Experimental Analysis and Modeling, Polymer Engineering and Science, Society of Plastics Engineers, pp. 2517-2525 (2011).
Glass Fiber, Wikipedia, The Free Encyclopedia, 2023.
Notification of Reexamination with English-language Translation, CN Application No. 201880039159.0 dated Nov. 2, 2023.
Common knowledge evidence 1 (CE1): "Lightweight Handbook 3: Lightweight Processing Techniques: Forming, Processing and Processing," edited by Henning et al., translated by Beijing Yongli Information Technology Co., Ltd., pp. 253-254, published by Beijing University of Technology Press in Mar. 2015, 1$^{st}$ edition, 1$^{st}$ printing.
Common knowledge evidence 2 (CE2): "New Fiber Materials Science," Jianxin HE, Donghua University Press, pp. 371-372, Jul. 31, 2014, 1$^{st}$ edition, 1$^{st}$ printing.

* cited by examiner

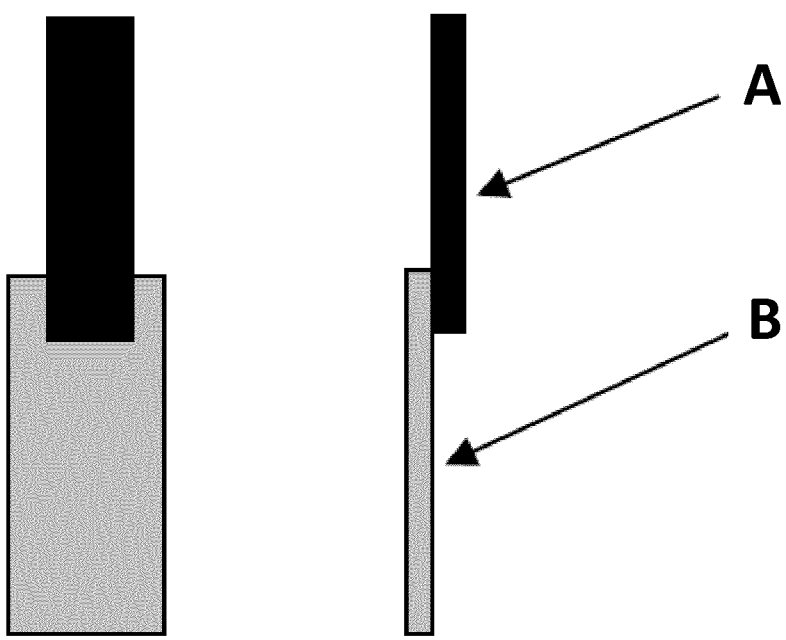

PROCESS FOR PLASTIC OVERMOLDING ON A METAL SURFACE AND PLASTIC-METAL HYBRIDE PART

This application is the U.S. national phase of International Application No. PCT/EP2018/065368 filed 11 Jun. 2018, which designated the U.S. and claims priority to EP Patent Application No. EP17176096.0 filed 14 Jun. 2017, and International Application No. PCT/CN2017/088639 filed 16 Jun. 2017, the entire contents of each of which are hereby incorporated by reference.

The invention relates to a process for manufacturing a plastic-metal hybrid part by plastic overmolding on a metal surface via nano-molding technology (NMT). The invention also relates to a plastic-metal hybrid part obtained by a nano-molding technology (NMT) process, wherein the hybrid part comprises a plastic material bonded to a surface area of a metal part.

Nano-molding technology is a technology wherein a plastic material is bonded to a metal part to form a so-called plastic-metal hybrid part, wherein the bonding strength at the metal-plastic interface results from or is enhanced by a pretreatment of the metal resulting in a surface area with surface irregularities of nano-size dimensions. Such irregularities have dimensions in the range of about a few nanometers up to a few hundreds of nanometers and suitably have a shape of ultrafine asperities, recesses, projections, grains and pores.

For the NMT metal pretreatment different technologies and different combinations of treatment steps can be applied. An NMT process that is mostly used is the process comprising a so-called "T-treatment". In the T-treatment, developed by Taisei Plas, the metal is fine etched by dipping the metal sheet into an alkaline solution. The alkaline solution is indicated as T-solution and the dipping step is indicated as T-treatment step. Suitably, the alkaline solution is an aqueous solution of a water soluble amine, such as ammonia or hydrazine. Generally, such solutions are applied with a pH of around 11. Such a process is described, for example, in patent applications US20060257624A1, CN1717323A, CN1492804A, CN101341023A, CN101631671A, and US2014065472A1. In the latter document the aluminum alloy obtained after the etching step in the aqueous ammonia or hydrazine solution had a surface characterized by ultrafine asperities of 20 to 80 nm period or ultrafine recesses or projections of 20 to 80 nm.

Another NMT metal pretreatment method comprises an anodizing treatment. In the anodizing treatment, the metal is anodized in an acidic solution to form a corroded layer with a porous metal oxide finish to form a kind of interpenetrated structure with the plastic material. Such a process is described, for example, in patent applications US20140363660A1 and EP2572876A1. In the latter document an example of an aluminum alloy formed by anodizing is described which is covered with a surface having holes, the openings of which have a number average inner diameter of 10 to 80 nm as measured under electron microscope observation.

Each of these processes may be combined with multiple steps, for example in combination with other etching, neutralizing and rinsing steps, and/or with the use of a primer, applied on the metal substrate prior to the metal substrate being overmolded with the plastic material. Finally, the metal part is inserted into a mold wherein resin is injected and bonded directly on the treated surface.

According to U.S. Pat. No. 8,858,854B1, the anodizing treatment has specific advantages over NMT processes comprising multi-stage pretreatment steps wherein the metal part is subjected to multiple chemicals baths including degreasing agents, acid solutions, base solutions, and lastly submerged in a T-solution and rinsed in diluted water. In the terminology of U.S. Pat. No. 8,858,854B1, NMT is limited to the process including the T-treatment step.

In the present invention, with the terms "nano-molding technology (NMT)" and "NMT process", is understood any overmolding of a metal subjected to a pretreatment process that results in metal a surface area with surface irregularities of nano-size dimensions, and thus includes both the anodizing method of U.S. Pat. No. 8,858,854B1 and the T-treatment solution of Taisei Plas, as well as other alternatives.

The polymers most widely used in plastic-metal hybrid parts made by NMT technology are polybutylene terephthalate (PBT) and polyphenylene sulfide (PPS). In US patent application US2014065472A1/U.S. Pat. No. 9,166,212B1 it is mentioned that "when the resin composition contained PBT or PPS as the main component, optionally compounded with a different polymer, and further contained 10 to 40 mass % of a glass fiber, it exhibited very strong joining strength with aluminum alloy. In the condition where the aluminum and resin composition were both plate shaped and joined to each other in an area of 0.5 to 0.8 $cm^2$ the shear fracture was 25 to 30 MPa. In the case of a resin composition where different polyamides were compounded the shear fracture was 20 to 30 MPa." For the preparation of the metal surfaces in the plastic-metal hybrid parts of US2014065472A1/U.S. Pat. No. 9,166,212B1 a "T-treatment" step, followed by an additional amine adsorption step were applied.

In patent application EP2572876A1, mentioned here before, a polyamide composition, comprising PA-66/6T/6I (in the wt. ratio 12/62/26) and 30 wt. % glass fibers, was applied on different NMT metal surfaces. Where the metal treatment comprised a T-treatment, the pore size was 25 nm. In case of anodizing treatment the pore size was 17 nm. For both hybrid systems, the bonding force was measured to be 25.5 MPa.

In view of the increasing importance of miniaturization and automation of various processes, there is a need for reducing the number of parts in assembled products, for integrating of functions of different parts and for improving the connection between different parts in such assemblies. The NMT process provides a very useful technology for combining plastic parts and metal parts being assembled by an integrated process, comprising shaping and assembling in one step, by overmolding of a plastic material on a metal surface while simultaneously arriving at a reasonable bonding force via nano-molding technology.

In this respect NMT lends itself very well for being combined with a laser direct structuring (LDS) process, a process in which a conductive pattern is applied on a plastic carrier via activation of an LDS additive in the polymer composition. Processes and products which combine NMT and LDS are known from CN-105694447-A. This patent application describes a polyamide resin composition used for NMT (nano molding technology) and having LDS (laser direct structuring) function. The composition comprises a polyamide, a laser direct structuring additive and optionally further components, like glass fiber, inorganic crystal whiskers, stabilizing agent, toughening agent, and lubricant. The polyamide is a semi-aromatic semi-crystalline polyamide (PPA), such as PA9T, PA6T/6I/66 or PA6T/6.

A problem with plastic-metal hybrid parts wherein the plastic material is a fiber reinforced polymer composition, is generally that bonding force is still too low or the material is too brittle or both. Whereas the brittleness may be improved by addition of, for example, an impact modifier, this typically leads to a significant reduction in stiffness of the plastic part and also in NMT bonding strength. Furthermore, the effectiveness of glass fibers as reinforcing agent can be reduced by the presence of, for example, abrasive components, such as titanium dioxide and laser direct structuring (LDS) additives and other hard particle fillers.

Therefore, there is a need for plastic-metal hybrid parts, and for a process for preparing such parts, in which the above problems are reduced, i.e. which show a higher bonding strength and/or less brittleness.

This aim has been achieved with the process according to the invention and with the plastic-metal hybrid parts according to the invention and obtainable by such process.

The process according to the invention is directed to the manufacturing of a plastic-metal hybrid part by overmolding a moldable plastic material on a metal surface via nano-molding technology (NMT), comprising steps of
(i) providing a metal substrate having a surface area with surface irregularities of nano-size dimensions;
(ii) providing a polymer composition;
(iii) forming a plastic structure on the metal substrate by molding said polymer composition directly on at least a part of the surface area with the surface irregularities of the metal substrate;
wherein the polymer composition comprises
(A) a thermoplastic polymer selected from thermoplastic polyamide, PPS or thermoplastic polyester, or any blend thereof, and
(B) silicon-boron glass fibers comprising predominantly silicon dioxide (SiO2) and boron trioxide (B2O3).

The effect of the invention is that brittleness is reduced, compared to plastic-metal hybrid parts made of corresponding compositions comprising E-glass based reinforcing fibers instead of the silicon-boron glass fibers, with retention of the tensile strength in large extent, while often the impact resistance and bonding force are also improved.

Herein the polymer composition is suitably molded on at least a part of the surface area with surface irregularities of nano-size dimensions. The metal substrate may also have multiple surface areas with surface irregularities of nano-size dimensions, in which at least one surface area, or at least a part thereof is overmolded with the polyamide composition.

For the metal substrate having a surface area with surface irregularities of nano-size dimensions, any metal substrate suitable for NMT technology may be employed in the present invention.

The pretreatment process applied for preparing the metal substrate used in the process according to the invention, may by any process suitable for preparing a surface area with surface irregularities of nano-size dimensions. Suitably, such a process comprises multiple pretreatment steps. Suitably, the pretreatment steps, applied in the NMT process comprise one or more pretreatment steps selected from the group consisting of
treatment with a degreasing agent;
treatment with an alkaline etching material;
treatment with an acid neutralizing agent;
treatment with an aqueous solution of a water soluble amine;
treatment with an oxidative component;
an anodizing step; and
treatment with a primer material.

In the embodiment wherein the NMT process comprises a step comprising treatment with an aqueous solution of a water soluble amine (so called T-treatment), the aqueous solution preferably is an aqueous ammonium or hydrazine solution.

In the embodiment wherein the NMT process comprises a pretreatment step of anodizing the metal substrate, any anodizing agent suitable for this purpose can be used. Preferably, the anodizing agent is selected from the group consisting of chromic acid, phosphoric acid, sulfuric acid, oxalic acid, and boric acid. In case a primer material is used, said primer material is suitably selected from the group consisting of organosilane, titanate, aluminate, phosphate, and zirconate.

The pretreatment process suitably comprises one or more rinsing steps in between subsequent pretreatment steps.

The nano-size surface irregularities suitably comprise asperities, recesses, projections, grains or pores, or any combination thereof. Also suitably, the nano-size surface irregularities have dimensions in the range of 10-100 nm. Dimensions include width, length, depth, height, diameter of a part of the irregularity.

The metal substrate in the process according to the invention can in principle be any metal substrate that can be modified by a pretreatment process and be overmolded by a plastic material. The metal substrate will typically be selected and shaped according to the requirements of the projected use. Suitably, the metal substrate is a stamped sheet metal substrate. Also the metal of which the metal substrate is composed may be chosen freely. Preferably, the metal substrate is formed from, or consists of a material selected from the group consisting of aluminum, aluminum alloy (for example 5052 aluminum), titanium, titanium alloy, iron, steel (for example stainless steel), magnesium, and magnesium alloy.

The composition according to the invention comprises glass fibers comprising predominantly silicon dioxide ($SiO_2$) and boron trioxide ($B_2O_3$), referred to herein as silicon-boron glass fibers. With the term "predominantly" in comprising predominantly is herein understood that the silicon dioxide ($SiO_2$) and boron trioxide ($B_2O_3$) are the main components in the glass fibers. The silicon-boron glass fibers may comprise further components, but such components, if present at all, are present in a combined amount less than each of the silicon dioxide and the boron dioxide. Suitably, the silicon-boron glass fibers comprise silicon dioxide and boron trioxide in a combined amount of at least 90 wt. %, relative to the weight of the silicon-boron glass fibers. In a particular embodiment, the silicon-boron glass fibers consist of (a) 65-85 wt. % $SiO_2$; (b) 15-30 wt. % B2O3; (c) 0-4 wt. % sodium oxide ($Na_2O$) or potassium oxide ($K_2O$), or a combination thereof; and (d) 0-4 wt. % other components. In a further embodiment, the silicon-boron glass fibers consist of: (a) 70-80 wt. % $SiO_2$; (b) 18-27 wt. % $B_2O_3$; (c) 0-3 wt. % $Na_2O$ or $K_2O$, or a combination thereof; and (d) 0-3 wt. % other components. An example thereof is silicon-boron glass fibers consisting of: (a) 70-80 wt. % $SiO_2$; (b) 20-25 wt. % $B_2O_3$; (c) 0-2 wt. % $Na_2O$ or $K_2O$, or a combination thereof; and (d) 0-2 wt. % other components. Herein the weight percentages (wt. %), i.e. the weight percentages of (a)-(d), are relative to the weight of the silicon-boron glass fibers.

Fibers are herein understood to be materials having an aspect ratio L/W (length/width) of at least 10. A fiber typically has an elongated body having dimensions of a length, a width and a thickness, with the length dimension of said body being much greater than the transverse dimensions of width and thickness. With the term 'width' is herein understood the largest dimension measured on a cross-section in transverse direction, and with the term thickness is herein understood the smallest dimension measured on a cross-section in transverse direction.

The silicon-boron glass fibers may have various cross-sections, with a circular shape, or an irregular shape (i.e. non-circular shape with different width and thickness), e.g. a bean-shape, an oval shape, an oblong shape or a rectangular shape, with a greater width than thickness. More particular, the silicon-boron fibers in the composition according to the present invention suitably have an aspect ratio, defined by the ratio of length/width (L/W) of at least 15. In a particular embodiment, the glass fibers have a number average aspect ratio L/W of at least 20. The glass fibers suitably have a circular cross section. Herein the width and thickness are the same and together referred to as diameter. The fibers may also have a cross section with varying dimensions, for example non-circular and flat glass fibers. Suitably, the fibers have a circular cross section with a diameter in the range of 5-20 µm, more particular 7-15 µm, for example 8 µm, or 10 µm or 13 µm. Alternatively, the fibers have a non-circular cross section with a width in the range of 5-30 µm, more particular 7-20 µm, for example 8 µm, or 10 µm, or 13 µm, or 15 µm. The glass fibers with non-circular cross section, may have an aspect ratio, for example, between 1/2 and 1/6. Herein the aspect ratio is the ratio T/W between the smallest diameter (thickness T) and the largest diameter (width W) of the cross section.

The polymer composition used in the process and the plastic-metal hybrid part according to the present invention, may comprise the thermoplastic polymer selected from thermoplastic polyamide, thermoplastic polyester, or PPS, or any blend thereof (also referred to herein as component A) and silicon-boron fibers (also referred to herein as component B) in amounts varying over a wide range. Suitably, the composition comprises the thermoplastic polymer (A) in an amount in the range of 30-90 wt. %, for example in an amount in the range of 35-80 wt. %, more particular 40-70 wt. %. The silicon-boron glass fibers are suitably present in an amount in the range of 10-70 wt. %, for example in the range of 20-60 wt. %. The amount of the silicon-boron glass fibers is, for example, 25 wt. %, 30 wt. %, 40 wt. %, 50 wt. % or 65 wt. %. Herein the weight percentages (wt. %) are relative to the total weight of the composition.

The polymer composition used in the present invention comprises a thermoplastic polymer (A) selected from thermoplastic polyamide, a thermoplastic polyester and polyphenylene sulfide (PPS), or a blend thereof. Herein the thermoplastic polymer (A) suitably comprises
an aliphatic polyamide, a semi-crystalline semi-aromatic polyamide or an amorphous semi-aromatic polyamide, or a blend thereof, preferably a blend of a semi-crystalline semi-aromatic polyamide and an amorphous semi-aromatic polyamide, or
polybutylene terephthalate PBT), or polyethylene terephthalate (PET), or a blend thereof, preferably a blend of PBT and PET.

With the term "thermoplastic" in thermoplastic polymer is herein understood a semi-crystalline polymer having a melting temperature (Tm) in the range of 180° C.-360° C., or an amorphous polymer having a glass transition temperature (Tg) in the range of 125° C.-300° C. The effect of the thermoplastic polymer in the composition in combination with the silicon-boron glass fibers is that the composition can be prepared by a melt mixing process and that the composition can be melt-processed for making the NMT molded parts.

With the term "semi-crystalline" in semi-crystalline polyamide and semi-crystalline polyester is herein understood that the polyamide or polyester has a melting temperature (Tm) and a melting enthalpy (ΔHm), as well as a glass transition temperature (Tg). Herein the semi-crystalline polyamide, as well as the semi-crystalline polyester, has a melting enthalpy of at least 5 J/g, preferably at least 10 J/g, and even more preferably at least 25 J/g. Polymers having a melting enthalpy of less than 5 J/g are herein understood to be amorphous polymers.

With the term "melting enthalpy" (ΔHm) is herein understood the melting enthalpy, measured by the DSC method according to ISO-11357-1/3, 2011, on pre-dried samples in an $N_2$ atmosphere with heating and cooling rate of 20° C./min. Herein (ΔHm) has been calculated from the surface under the melting peak in the second heating cycle.

With the term "melting temperature" is herein understood the temperature, measured by the differential scanning calorimetry (DSC) method according to ISO-11357-113, 2011, on pre-dried samples, in an $N_2$ atmosphere with heating and cooling rate of 20° C./min. Herein Tm is the temperature from the peak value of the highest melting peak in the second heating cycle.

With the term 'glass transition temperature' (Tg) is herein understood the temperature, measured by the DSC method according to ISO-11357-1/2, 2011, on pre-dried samples in an $N_2$ atmosphere with heating and cooling rate of 20° C./min. Herein the Tg is calculated from the value at the peak of the first derivative (with respect of temperature) of the parent thermal curve corresponding with the inflection point of the parent thermal curve for the second heating cycle.

In one preferred embodiment of the process according to the invention, and of the plastic-metal hybrid part according to the invention, the polymer composition comprises a blend of a semi-crystalline semi-aromatic polyamide (sc-PPA) and an amorphous semi-aromatic polyamide (am-PPA). Herein the sc-PPA and the am-PPA can be used in amounts varying over a wide range. The advantage thereof is that the bonding force in the plastic-metal hybrid part is improved compared to corresponding compositions comprising the semi-crystalline semi-aromatic polyamide (sc-PPA) but not comprising the amorphous semi-aromatic polyamide (am-PPA).

With a semi-aromatic polyamide is herein understood a polyamide derived from monomers comprising at least one monomer containing an aromatic group and at least one aliphatic or cycloaliphatic monomer. Suitably, the semi-aromatic polyamide used in the present invention is derived from about 10 to about 75 mole % of the monomers containing an aromatic group. Accordingly, preferably about 25 to about 90 mole % of the remaining monomers are aliphatic and/or cycloaliphatic monomers.

The semi-crystalline semi-aromatic polyamide suitably has a melting temperature around 270° C., or above. Preferably the melting temperature (Tm) is at least 280° C., more preferably in the range of 280-350° C., or even better 300-340° C. Suitably, the semi-crystalline semi-aromatic polyamide has a melting enthalpy of at least 15 J/g, preferably at least 25 J/g, and more preferably at least 35 J/g. Herein the melting enthalpy is expressed relative to the weight of the semi-crystalline semi-aromatic polyamide. A higher melting temperature and higher Tg can generally be achieved by using a higher content in an aromatic monomer for example terephthalic acid and/or shorter chain diamines in the polyamide. The person skilled in the art of making polyamide molding compositions will be capable of making and selecting such polyamides.

Examples of suitable monomers containing aromatic groups are terephthalic acid and its derivatives, isophthalic acid and its derivatives, naphthalene dicarboxylic acid and its derivatives, $C_6$-$C_{20}$ aromatic diamines, p-xylylenediamine and m-xylylenediamine.

Preferably, the composition according to the invention comprises a semi-crystalline semi-aromatic polyamide derived from monomers comprising terephthalic acid or one of its derivatives.

The semi-crystalline semi-aromatic polyamide can further contain one or more different monomers, either aromatic, aliphatic or cycloaliphatic. Examples of aliphatic or cycloaliphatic compounds from which the semi-aromatic polyamide may further be derived include aliphatic and cycloaliphatic dicarboxylic acids and its derivatives, aliphatic $C_4$-$C_{20}$ alkylene diamines and/or $C_6C_{20}$ alicyclic diamines, and amino acids and lactams. Suitable aliphatic dicarboxylic acids are, for example, adipic acid, sebacic acid, azelaic acid and/or dodecanedioic acid. Suitable diamines include butanediamine, hexamethylenediamine; 2 methylpentamethylenediamine; 2-methyloctamethylenediamine; trimethylhexamethylene-diamine; 1,8-diaminooctane, 1,9-diaminononane; 1,10-diaminodecane and 1,12-diaminododecane. Examples of suitable lactams and amino acids are 11-aminododecanoic acid, caprolactam, and laurolactam.

Examples of suitable semi-crystalline semi-aromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I), poly(caprolactam-hexamethylene terephthalamide) (polyamide 6/6,T), hexamethylene terephthalamide/hexamethylene isophthalamide (6,T/6,I) copolymer, polyamide 10,T/10,12, polyamide 10T/10,10 and the like.

Preferably, the semi-crystalline semi-aromatic polyamide is a polyphthalamide, represented by the notation PA-XT or PA-XT/YT, wherein the polyamide is built from repeat units derived from terephthalic acid (T) and one or more linear aliphatic diamines. Suitable example thereof are PA-8T, PA-9T, PA-10T, PA-11T, PA8T/6T, PA4T/6T, and any copolymers thereof.

In a preferred embodiment of the invention, the semi-crystalline semi-aromatic polyamide has a number average molecular weight (Mn) of more than 5,000 g/mol, preferably in the range of 7,500-50,000 g/mol, more preferably 10,000-25,000 g/mol. This has the advantage that the composition has a good balance in mechanical properties and flow properties.

Examples of suitable amorphous semi-aromatic polyamides are PA-XI, wherein X is an aliphatic diamine, and amorphous copolyamides thereof (PA-XI/YT), such as PA-6I and PA-8I, and PA-6I/6T or PA-8I/8T (for example PA-6I/6T 70/30). Preferably, the amorphous semi-aromatic polyamide comprises, or consists of amorphous PA-6I/6T.

In a preferred embodiment, the polymer composition comprises
(A.1) 30-70 wt. % of the semi-crystalline semi-aromatic polyamide and
(A.2) 10-40 wt. % of the amorphous semi-aromatic polyamide;
(B) 20-70 wt. % of the silicon-boron glass fibers;
wherein the weight percentages (wt. %) are relative to the total weight of the composition.

In another preferred embodiment, the polymer composition comprises a blend of PBT and PET. The effect thereof is that the bonding force at the interface between the metal part and the plastic part is increased, compared to the corresponding composition only comprising PBT as polyester component and no PET, next to the silicon-borate glass fibers.

Suitably, PBT, PET and silicon-boron glass fibers are comprised by the polymer composition in the following amounts:
(A.3) 30-80 wt. % of PBT,
(A.4) 10-40 wt. % of PET, and
(B) 10-70 wt % of the silicon-boron glass fibers.

Herein the weight percentages wt, % are relative to the total weight of the composition, and the sum of components A-B is at most 100 wt. %.

Next to thermoplastic polymer (A) and the silicon-boron fibers (B), the composition may comprise other components.

The composition can comprise, next to components A and B, one or more further components. Such components may be selected from auxiliary additives and any other component suitable for use in the plastic-metal hybrid part. The amount thereof can also be varied over a wide range. The one or more further components are together referred to as component C.

In this respect the composition suitably comprises at least one component selected from reinforcing agents, flame retardants, flame retardant synergists and auxiliary additives for thermoplastic molding compositions known by one skilled in the art suitable to improve other properties. Suitable auxiliary additives include acid scavengers, plasticizers, stabilizers (such as, for example, thermal stabilizers, oxidative stabilizers or antioxidants, light stabilizers, UV absorbers and chemical stabilizers), processing aids (such as, for example, mold release agents, nucleating agents, lubricants, blowing agents), pigments and colorants (such as, for example, carbon black, other pigments, dyes), and antistatic agents.

Herein the reinforcing agent suitable comprises fibers, or fillers, or a combination thereof. More particular, the fibers and fillers are preferably selected from materials consisting of inorganic material. Examples thereof include the following fibrous reinforcing materials: glass fibers, carbon fibers, and mixtures thereof. Examples of suitable inorganic fillers that the composition may comprise, include one or more of glass beads, glass flakes, kaolin, clay, talc, mica, wollastonite, calcium carbonate, silica and potassium titanate.

It is noted that the fibrous reinforcing materials and the glass fibers mentioned here under fibrous reinforcing materials are meant to be fibrous reinforcing materials and glass fibers different from the silicon-boron glass fibers. Examples thereof are E-glass fibers.

In case the composition comprises E-glass fibers, preferably the E-glass fibers are present in an amount of at most 30 wt. %, preferably at most 15 wt. %, relative to the weight of the silicon-boron glass fibers.

As said before fibers are herein understood to be materials having an aspect ratio L/W (length/width) of at least 10. Suitably, the fibrous reinforcing agent has an L/D of at least 15, preferably at least 20. Fillers are herein understood to be materials having an aspect ratio L/W of less than 10. Suitably, the inorganic filler has an L/W of less than 5. In the aspect ratio L/W, L is the length of an individual fiber or particle and W is the width of an individual fiber or particle.

Suitably, the amount of component C is in the range of 0-30 wt. %. Correspondingly, the combined amount of A and B suitably is at least 70 wt. %. Herein all the weight percentages (wt. %) are relative to the total weight of the composition.

In a preferred embodiment, the composition used in the process according to the invention and in the NMT molded part made thereof, consists of:
 (A) 30-80 wt. % of the thermoplastic polymer;
 (B) 20-70 wt. % of the boron silicon glass fibers;
 (C) 0-30 wt. %, preferably 0.1-20 wt. % of at least one other component;

Herein the weight percentages wt,% are relative to the total weight of the composition, and the sum of A-D is 100 wt. %.

The total amount of other components C can be, for example, about 1-2 wt. %, about 5 wt. %, about 10 wt. %, or about 20 wt. %. Preferably, the composition comprises at least one further component, and the amount of C is in the range of 0.1-20 wt. %, more preferably 0.5-10 wt. %, or even 1-5 wt. %. Correspondingly, A and B are present in a combined amount in the range of 80-99.9 wt. %, 90-99.5 wt. %, respectively 95-99 wt. %.

In a particular preferred embodiment of the process according to the invention the polymer composition comprises a laser direct structuring (LDS) additive. The effect of the composition comprising the LDS additive in combination with the silicon-boron glass fibers is that the tensile elongation has increased, with retention of the tensile strength in large extent, compared to corresponding compositions comprising E-glass based reinforcing fibers.

The process according to the invention suitably combines steps for the NMT bonding process and steps for the laser direct structuring (LDS) process. This combination constitutes a preferred embodiment. According to this embodiment, the process comprises, next to steps (i)-(iii), steps of
 (iv) subjecting a surface area of the plastic structure formed on the metal substrate to a laser beam, thereby activating the surface area subjected to the laser beam, and
 (v) subjecting the plastic-metal hybrid part comprising an activated surface area obtained by step (iv) to an electroless plating process, thereby forming a metal based conductive pattern on the activated surface area.

For the LDS process, the goal is the production of a conductive path on a molded part through formation of a laser etched surface, and formation of a plated metal layer during a subsequent plating process. The conductive path can be formed by electroless plating process e.g. by applying a standard process, such as a copper plating process. Other electroless plating processes that may be used include, but are not limited to, gold plating, nickel plating, silver plating, zinc plating, tin plating or the like. In such a process laser radiation activates the polymer surface for the subsequent plating process. When an article comprising an LDS additive is exposed to the laser, its surface is activated. Without being bound by a theory, it seems that during activation with the laser metal complexes break down to metal nuclei. The laser draws a circuit pattern onto the part and leaves behind a roughened surface containing embedded metal particles. These particles act as nuclei for the plating process and enable adhesion of the metallization layer in metallization process. Plating rate and adhesion of the plated layer are key evaluation requirements.

The LDS additive is selected to enable the composition to be used in a laser direct structuring process. In an LDS process, an article made of the thermoplastic composition comprising the LDS additive is exposed to a laser beam to activate metal atoms from the LDS additive at the surface of the thermoplastic composition. As such, the LDS additive is selected such that, upon exposure to a laser beam, metal atoms are activated and exposed and in areas not exposed to the laser beam, no metal atoms are exposed. In addition, the LDS additive is selected such that, after being exposed to a laser beam, the etching area is capable of being plated to form conductive structure. As used herein "capable of being plated" refers to a material wherein a substantially uniform metal plating layer can be plated onto a laser-etched area and show a wide process window for laser parameters.

Examples of LDS additives useful in the present invention include, but are not limited to, spinel based metal oxides and copper salts, or a combination including at least one of the foregoing LDS additives. Examples of suitable copper salts are copper hydroxide phosphate, copper phosphate, copper sulfate, cuprous thiocyanate. Spinel based metal oxides are generally based on heavy metal mixtures, such as in copper chromium oxide spinel, e.g. with formula $CuCr_2O_4$, nickel ferrite, e.g. spinel with formula $NiFe_2O_4$, zinc ferrite, e.g. spinel with formula $ZnFe_2O_4$, and nickel zinc ferrite, e.g. spinel with formula $Zn_xNi_{(1-x)}Fe_2O_4$ with x being a number between 0 and 1.

In a preferred embodiment, the LDS additive is a heavy metal mixture oxide spinel, more particular a copper chromium oxide spinel or a nickel zinc ferrite, or a combination thereof. Suitably, the nickel zinc ferrite is a spinel with formula $Zn_xNi_{(1-x)}Fe_2O_4$ with x being a number in the range of 0.25-0.75.

The LDS additive is suitably present in amount in the range of 1.0-10 wt. %. More particular, the amount is in the range from 2 to 9.5 wt. %, or in the range of 3 to 9 wt. %, or even 4 to 8.5 wt. %, relative to the total weight of the composition.

The present invention also relates to a plastic-metal hybrid part comprising a plastic material bonded to a surface area of a metal part, obtained by a nano-molding technology (NMT) process. In the plastic-metal hybrid part according to the invention the plastic material is a polymer composition comprising
 (A) thermoplastic polymer selected from a thermoplastic polyamide, polyphenylene sulfide (PPS) and a thermoplastic polyester, or a blend thereof; and
 (B) silicon-boron glass fibers comprising predominantly silicon dioxide ($SiO_2$) and boron trioxide ($B_2O_3$),
or any particular or preferred embodiment thereof as described above.

The plastic-metal hybrid part according to the invention may be any metal hybrid part, obtainable by the process according to the invention or any particular or preferred embodiment or modification thereof as described herein above.

In a particularly preferred embodiment, the plastic-metal hybrid part has a bonding force between the metal part and the plastic material, measured by the method according to ISO19095 at 23° C. and a tensile speed of 10 mm/min, in the range of 40-70 MPa, for example in the range of 45-65 MPa. The bonding force can be, for example, about 50 MPa, or about 55 MPa, or below, or between, or above said values. The higher the bonding force the more versatile and flexible the product designer can design the plastic-metal hybrid part.

The plastic-metal hybrid part according to the present invention, and the various embodiments thereof, are suitably used in medical applications, automotive applications, aerospace applications, military applications, antennas, sensors, security housings and connectors. Therefore, the invention also relates to antennas, sensors, security housings and connectors comprising a plastic-metal hybrid part according to the present invention. The invention is in particular suited for applications wherein an electrical and electronic functions are integrated with a structural metal part, for example antennas or sensors integrated with a metal back frame or middle frame for mobile electronic devices.

The invention is further illustrated with the following Examples and Comparative Experiments.

Materials
- sc-PPA-A semi-crystalline semi-aromatic polyamide, PA6T/4T/66 based, melting temperature 325° C., glass transition temperature 125° C.;
- PBT polybutylene terephthalate, grade having a relative solution viscosity (RSV) in m-cresol of 1.85
- GF-A E-glass fibers (Ø 10 μm), standard grade for thermoplastic molding compositions
- GF-B silicon-boron glass fibers (Ø 10 μm), (75 wt. % SiO2; 22 wt. % B2O3; 3 wt. % other oxides)
- LDS additive CuCrOx spinel (Shephard black)
- Miscellaneous Auxiliary additives: heat stabilizer (HS) and color master batch Cabot PA3785 (Carbon black) (MB)
- Metal plates Aluminum plates, grade Al6063, measuring 18 mm×45 mm×1.6 mm; pretreated by a process comprising: degreasing with ethanol, etching with an alkaline solution, neutralizing with an acidic solution, and fine etching with an aqueous ammonia solution (so-called T-treatment).

Preparation of Compositions

Two glass fiber reinforced compositions based on sc-PPA and two glass fiber reinforced compositions based on PBT and LDS additive were prepared according to the formulations of Comparative Experiment A and Example I in Table 1. The preparations were carried out in a twin screw extruder using standard compounding conditions.

Overmolding of Metal Plates with Compositions according to Comparative Experiment A and Example I Test samples were prepared by overmolding the metal plates after putting the metal plates in a mold set at 140° C. and injecting the polyamide composition from an injection molding machine at a melt temperature of 20° C. above the melting temperature of the polyamide composition.

After injection molding the polyamide composition and thus forming of the metal hybrid parts, the resulting metal-plastic hybrid parts were demolded.

Overmolding of Metal Plates with Compositions of Comparative Experiment B and Example II Test samples were prepared by overmolding the metal plates after putting the metal plates in a mold set at 90° C. and injecting the PBT/LDS composition from an injection molding machine at a melt temperature of 270° C.

After injection molding of the PBT/LDS composition and thus forming of the metal hybrid parts, the resulting metal-plastic hybrid parts were demolded.

The test samples had the following dimensions: The size of the plates was 18 mm×45 mm×1.6 mm. The size of the plastic part was 10 mm×45 mm×3 mm. The overlapping bonding area was 0.482 cm². The shape and relative position of the metal part and plastic part are schematically shown in FIG. 1.

FIG. 1. Schematic representation of the test samples, wherein the black part (A) is the plastic part, and the grey part (B) is the metal part.

TEST METHODS

Relative Solution Viscosity

RSV (relative solution viscosity) of PBT was analyzed according to ISO 1628-5. This method describes the determination of the viscosity of PBT in dilute solution in m-cresol using capillary viscometers. The PBT samples were dissolved during 15 min at 135° C. and diluted in m-cresol; concentration was 1 gram in 100 gram m-cresol at 25° C. The flow time of the m-cresol and the flow time of the PBT solution were measured at 25° C. The RSV was calculated from these measurements.

Bonding Strength Test Method.

The bonding strength methods for the adhesion interface in the plastic-metal assemblies was measured by the method according to ISO19095 at 23° C. and a tensile speed of 10 mm/min. The results have been included in Table 1.

TABLE 1

Compositions and test results for Comparative Experiments A-B and Examples I-II on aluminum plates.

| Composition (wt. %) | CE-A | EX-I | CE-B | EX-II |
|---|---|---|---|---|
| sc-PPA | 57.8 | 57.8 | 0 | 0 |
| PBT | 0 | 0 | 65 | 65 |
| GF-A | 40 | 0 | 30 | 0 |
| GF-B | 0 | 40 | 0 | 30 |
| LDS additive | 0 | 0 | 5 | 5 |
| Color MB | 2 | 2 | 0 | 0 |
| Heat Stabilizer | 0.2 | 0.2 | 0 | 0 |
| Total | 100 | 100 | 100 | 100 |
| Test Results | | | | |
| Bonding Strength | Moderate | Good | Moderate | Moderate-Good |
| Impact Resistance | Moderate | Good | | |
| Tensile Elongation at break | | | Moderate | Good |

The invention claimed is:

1. A process for manufacturing a plastic-metal hybrid part by plastic overmolding on a metal surface via nano-molding technology (NMT), wherein the process comprises the steps of:
   (i) providing a metal substrate having a surface area with surface irregularities of nano-size dimensions;
   (ii) providing a polymer composition; and
   (iii) forming a plastic structure on the metal substrate by molding said polymer composition directly on at least a part of the surface area with the surface irregularities of the metal substrate;
   wherein the polymer composition consists of:
   (A) 30-80 wt. % of a thermoplastic polyamide component;
   (B) 20-70 wt. % of silicon-boron glass fibers comprising predominantly silicon dioxide ($SiO_2$) and boron trioxide ($B_2O_3$); and
   (C) 0.5-10 wt. % of other components, wherein the other components are selected from the group consisting of glass fibers, carbon fibers, glass beads, glass flakes, kaolin, clay, talc, mica, wollastonite, calcium carbonate, silica, potassium titanate, flame retardants, flame retardant, synergists, acid scavengers, plasticizers, stabilizers, processing aids, pigments and colorants, and antistatic agents, wherein components (A) and (B) are present in a combined amount of 90-99.5 wt. %, and wherein all weight percentages (wt. %) are relative to the total weight of the polymer composition.

2. The process according to claim 1, wherein the metal substrate is formed from a material selected from the group consisting of aluminum, aluminum alloy, titanium, titanium alloy, iron, steel, magnesium, and magnesium alloy.

3. The process according to claim 1, wherein the process comprises, prior to step i), a step of anodizing the metal substrate using an anodizing agent selected from the group consisting of chromic acid, phosphoric acid, sulfuric acid, oxalic acid, and boric acid.

4. The process according to claim 1, wherein the silicon-boron glass fibers comprise silicon dioxide and boron trioxide in a combined amount of at least 90 wt. %, relative to the weight of the silicon-boron glass fibers.

5. The process according to claim 4, wherein the silicon-boron glass fibers consist of:
(a) 65-85 wt. % of $SiO_2$;
(b) 15-30 wt. % of $B_2O_3$;
(c) 0-4 wt. % of sodium oxide ($Na_2O$) or potassium oxide ($K_2O$), or a combination thereof; and
(d) 0-4 wt. % of other components; wherein
the weight percentages (wt. %) are relative to the weight of the silicon-boron glass fibers.

6. The process according to claim 1, wherein the polymer composition comprises E-glass fibers in an amount of at most 30 wt. %, relative to the weight of the silicon-boron glass fibers.

7. The process according to claim 1, wherein the thermoplastic polyamide component is selected from the group consisting of aliphatic polyamides, semi-crystalline semi-aromatic polyamides, amorphous semi-aromatic polyamides and blends thereof.

8. The process according to claim 7, wherein the polymer composition comprises:
(A.1) 30-70 wt. % of the semi-crystalline semi-aromatic polyamide and (A.2) 10-40 wt. % of the amorphous semi-aromatic polyamide; and
(B) 20-70 wt. % of the silicon-boron glass fibers;
wherein the weight percentages (wt. %) are relative to the total weight of the polymer composition.

9. The process according to claim 8, wherein the thermoplastic polyamide component comprises a blend of a semi-crystalline semi-aromatic polyamide and an amorphous semi-aromatic polyamide.

10. The process according to claim 1, wherein the polymer composition comprises E-glass fibers in an amount of at most 15 wt. %, relative to the weight of the silicon-boron glass fibers.

11. The process according to claim 1, wherein the polymer composition comprises a laser direct structuring (LDS) additive.

* * * * *